March 3, 1942.  M. J. ZIMMER  2,274,817

METAL HANDLED TOOL

Filed Jan. 17, 1939

INVENTOR.
Myron J. Zimmer
BY Stanley Hoods
ATTORNEY.

Patented Mar. 3, 1942

2,274,817

UNITED STATES PATENT OFFICE 2,274,817

METAL HANDLED TOOL

Myron J. Zimmer, Chicago, Ill., assignor to The Edward Katzinger Company, Chicago, Ill., a corporation of Illinois Application January 17, 1939, Serial No. 251,401

4 Claims. (Cl. 16—110)

This invention relates to metal handled tools, and in particular tools of this type adapted for kitchen use.

This invention relates more especially to the manufacture and production of a metal handled kitchen tool or the like embodying a tool and handle stub assembly and a coacting metal shell to form a hollow metal handle portion complementary to said stub assembly.

It is an object of this invention to provide a handle whose construction and assembly is such that the same may be readily manufactured under conditions consistent with the production of relatively inexpensive kitchen tools and yet resulting in the creation of an article comparable in appearance and construction with the more expensive goods of this type.

With the above and other objects in view, as will be apparent, this invention consists in the construction, combination and arrangement of parts all as hereinafter more fully described, claimed and illustrated in the accompanying drawing, wherein:

Figure 1:
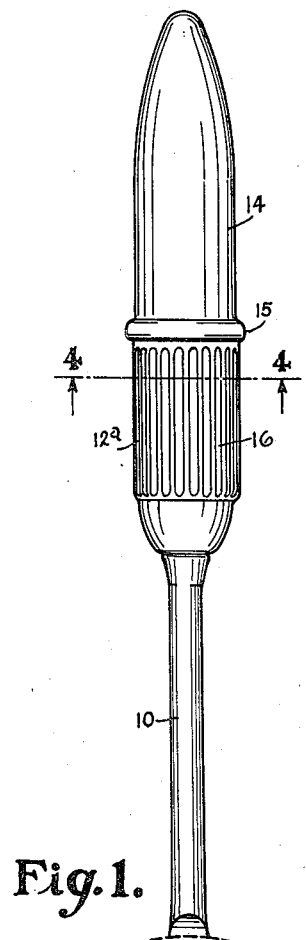
Fig. 1 is a side elevation of a metal handled tool constructed in accordance with this invention, with a dotted line representation of a typical tool blade.

Reference being had more particularly to the drawing, a tool or kitchen utensil which may be of any suitable form, as indicated in dotted lines in Fig. 1, provides a metal tang or shank 10, the rear end of which is adapted to have a drive fit in the bore 11 of a suitable handle end or stub 12. The stub 12 is preferably formed of wood or other similar material, and is designed to give it the form shown in the drawing or any other desired shape. The stub 12 is also provided with a circumferential projection 13 spaced rearwardly from the toolward end of said stub for a purpose which will hereinafter appear.

Driven or otherwise secured over the stub 12 is a metallic shell or elongated ferrule 12a stamped and drawn to give it the form substantially corresponding to the contour of the stub 12, as shown in the drawing. The provision of longitudinal corrugations or flutes 16 in the walls of the shell 12a serve to give the article a surface which aids in the grasping thereof by the hand of the user as well as to improve its appearance. In fitting the shell or ferrule 12a over the stub 12, an offset rim 13a formed at the mouth of the ferrule 12a is adapted to engage and embrace the projection 13 of the stub 12. The ferrule 12a is also provided at its forward end with an opening 11a in registry with the entrance to the bore 11 of the stub 12, through which the shank 10 of the tool such as that shown in dotted lines in Fig. 1, may be passed. Thus the stub 12, ferrule 12a and the shank 10 are firmly joined as a unit without further provision of parts to retain their interconnection.

Figure 3:
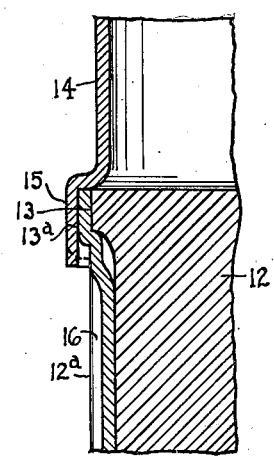
Fig. 3 is an enlarged fragmentary sectional view of the handle elements in position for final assembly.
Figure 4:
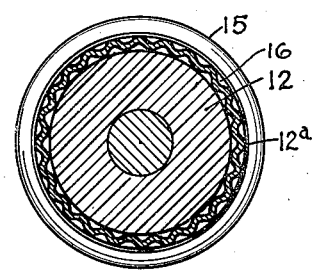
Fig. 4 is an enlarged section taken on line 4—4 of Fig. 1.
Figure 2:
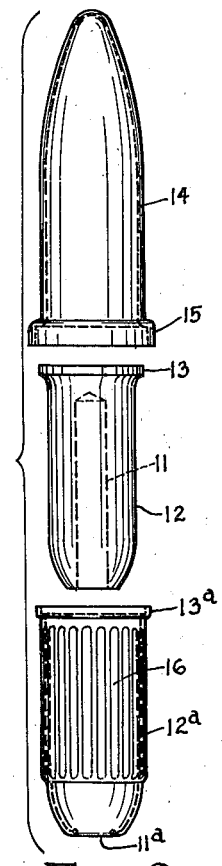
Fig. 2 is an elevational view of the handle elements, spaced one from the other, preparatory to assembly.

The base of the stub handle assembly or unit described above, being that portion in trailing relation to the tool carried thereby, is preferably enclosed by a tubular metal tip or shell 14, having a closed rear end and an open front end which, like the ferrule 12a, is preferably formed from a metal blank stamped and drawn to give it a handle shape complementary to the stub 12 and the stub handle assembly or unit. The open front end or mouth of the shell 14 is provided with an outwardly offset rim 15 defining a lip adapted to embrace the rim 13a of the ferrule 12a and the projection 13 of the stub 12 cooperating therewith. Thus, as shown in Fig. 3, the rim 13a of the ferrule provides a shoulder at its inner limits against which the projection or bead 13 of the stub 12 is adapted to be seated, while the shoulder at the inner limits of the rim 15 of the shell 14 forms a seat for the rear limits of the rim 13a of the ferrule and the corresponding surface of the projection 13 of the stub 12, while the free front edge of the rim 15 on the shell 14 terminates beyond the inner limits of said rim 13a of the ferrule and the projection 13 on the stub 12. By the use of suitable mechanism, the extreme edge of the rim 15 is then bent and curled over the forward or inner limits of the bead or projection 13 of the handle stub and the interposed overlying portion of the ferrule 12a, to-wit the rim 13a, as shown in Fig. 1, whereby the shell 14, ferrule 12a and stub 12 are clinched against separation. The projection 13 on the stub 12, and the rims 13a and 15 of the ferrule and rear shell respectively, accordingly constitute interlocking means rigidly joining the shell 14 and stub 12 and ferrule 12a in partially telescoped relation with a substantial portion of the stub and ferrule disposed exteriorly of the shell, and the rear limits of the stub and ferrule spaced forwardly of the rear end of the shell. The projection 13 of the stub 12 serves as an anvil or abutment to aid in performing this clinching operation, and the tight compression of said rims 13ª and 15 against said projection 13 creates a water tight joint therebetween. As shown in Fig. 1, the clinching of the rims 13ª and 15 results in the formation of a joint between the elements of the handle which appears as an integral bead or part of a one-piece handle. With a joint between the elements as described, the projection 13 of the stub 12 also serves as a reinforcement which materially strengthens the body of the entire handle.

Figure 5:
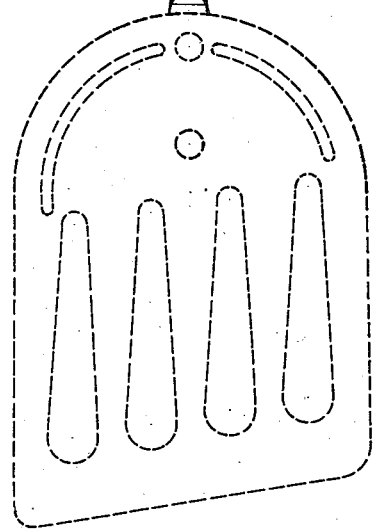
Fig. 5 illustrates a modified form of handle stub assembly and coacting shell.

As shown in Fig. 5, a stub handle assembly consisting of a stub 12ᵇ of wood, composition or other similar material corresponding to the stub 12 of the other views, but omitting a metal enclosure corresponding to the ferrule 12ª, may be created by joining the shell 14 directly to the projection 13ᵇ of the stub 12ᵇ, to provide a tool with a hollow metal handle portion as contemplated by this invention. This is accomplished by interlocking the bead 15 of the member 14 directly with the circumferential projection 13ᵇ on the stub 12ᵇ.

While specific examples of this invention have been described, it will be apparent that various changes may be made in the steps and instrumentalities employed in forming a metal handled tool of the character set forth, all without departing from the spirit of this invention as defined in the annexed claims.

What is claimed is:

1. In a handled tool, the combination with an elongated handle stub of wood in which the shank of a tool may be secured, a circumferential projection formed on and spaced rearwardly from the toolward end of said stub, a metal ferrule coacting with the toolward end of said stub and having its rear edge offset outwardly from the body of the ferrule to form a seat for the projection on the stub, independent means forming the butt end of a handle having a closed rear end and an open front end with the edge of the front end thereof offset outwardly from the body of the shell to form a seat for the rear edge of the ferrule and the corresponding portion of the stub, the free front edge of said shell terminating beyond said offset on the ferrule and being bent inwardly thereover to rigidly join said shell, stub and ferrule.

2. In a handled tool, the combination of means forming the butt end of a handle including an elongated metal shell having an open front end and a closed rear end, independent means forming the toolward end of a handle including a solid elongated handle stub in which the shank of a tool may be secured, outwardly offset interlocking portions rigidly joining said shell and stub in partially telescoped relation with a substantial portion of the stub disposed exteriorly of said shell, and its rearward end spaced forwardly of the rear end of the shell, said interlocking portions including means on a metal ferrule enclosing said exteriorly disposed portion of the stub.

3. In a handled tool, the combination of means forming the butt end of a handle including a metal shell having an open front end, independent means forming the toolward end of a handle including a solid handle stub in which the shank of a tool may be secured, means for nesting said stub in said shell with a substantial portion of the stub disposed exteriorly of said shell, and its rearward end spaced forwardly of the rear end of the shell including outwardly offset portions on said shell and stub, a metal ferrule coacting with a portion of the stub disposed exteriorly of said shell, and means for rigidly joining said shell and stub in such nested relation including means on said ferrule coacting with said outwardly offset portions on the shell and stub.

4. In a handled tool, the combination with a solid handle member having a central bore in which the shank of a tool may be received and secured, a circumferential projection formed on and spaced rearwardly from the toolward end of said solid handle member, means adapted to coact with the shank of a tool secured in such solid handle member and operative to conceal the entrance to said bore in the solid handle member including a metal ferrule in which said solid handle member is adapted to be nested, an offset formed on the rear edge of said ferrule providing a shoulder at its inner limits engageable with the projection on said solid handle member when the latter is nested in the ferrule, independent means forming the butt end of a handle including a metal shell having an open front end with the edge of said front end offset outwardly from its body to provide a shoulder at its inner limits engageable with the projection on said solid handle member and the rear edge of said ferrule, the free front edge of said shell terminating beyond said offset on the ferrule and being bent inwardly thereover to rigidly join said shell, solid handle member and ferrule.

MYRON J. ZIMMER.